US012683904B2

(12) United States Patent
Meiyappan Kannappan et al.

(10) Patent No.: US 12,683,904 B2
(45) Date of Patent: Jul. 14, 2026

(54) APPLICATION AWARE ADAPTIVE ROUTING

(71) Applicant: Juniper Networks, Inc., Sunnyvale, CA (US)

(72) Inventors: Arul Meiyappan Kannappan, Ottawa (CA); Shubham Soni, Rewa (IN); Pratik Soni, Bangalore (IN); Sharan Seshadri, Palo Alto, CA (US); Xin Kong, Milpitas, CA (US); Shivin Gopalani, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 45 days.

(21) Appl. No.: 18/949,753

(22) Filed: Nov. 15, 2024

(65) Prior Publication Data

US 2026/0142925 A1    May 21, 2026

(51) Int. Cl.
*H04L 47/2425* (2022.01)
*H04L 41/5019* (2022.01)
*H04L 47/2475* (2022.01)

(52) U.S. Cl.
CPC ...... *H04L 47/2425* (2013.01); *H04L 41/5019* (2013.01); *H04L 47/2475* (2013.01)

(58) Field of Classification Search
None
See application file for complete search history.

(56) References Cited

U.S. PATENT DOCUMENTS

| 6,459,682 B1 * | 10/2002 | Ellesson | H04L 47/2425 |
| | | | 370/468 |
| 6,714,517 B1 * | 3/2004 | Fawaz | H04L 47/522 |
| | | | 370/468 |

(Continued)

FOREIGN PATENT DOCUMENTS

| EP | 4149081 A1 | 3/2023 |

OTHER PUBLICATIONS

Juniper Networks, "Cloud Migration and Data Center Interconnect With Session Smart Routing", Juniper Networks International B.V., Aug. 2022, 5 pp., URL: https://www.juniper.net/content/dam/www/assets/solution-briefs/us/en/cloud-services/cloud-migration-and-data-center-interconnect-with-session-smart-routing.pdf.

(Continued)

*Primary Examiner* — Backhean Tiv
(74) *Attorney, Agent, or Firm* — Shumaker & Sieffert P.A.

(57) ABSTRACT

In general, this disclosure describes techniques for a computing system configured to obtain a plurality of records indicating historical traffic flows for an application having application instances executing at a plurality of data centers. The computing system may be configured to determine, based on the plurality of records, whether a current network configuration will satisfy service level expectations (SLEs) for the application, the current network configuration including first configuration information for a first set of links. The computing system may be configured to, based on determining the current network configurations will not satisfy the SLEs for the application: generate, based on the plurality of records and the SLEs, a new network configuration including second configuration information for a second set of links; provision, based on the new network configuration, (Continued)

the second set of links at the plurality of data centers to facilitate the traffic flows among the application instances.

20 Claims, 9 Drawing Sheets

(56)                References Cited

U.S. PATENT DOCUMENTS

| | | | | |
|---|---|---|---|---|
| 8,018,860 | B1 * | 9/2011 | Cook .................... | H04L 41/145 |
| | | | | 370/242 |
| 8,041,797 | B2 * | 10/2011 | Childress ............... | G06Q 10/06 |
| | | | | 370/254 |
| 8,189,486 | B2 * | 5/2012 | Krishnaswamy ....... | H04L 69/40 |
| | | | | 370/242 |
| 8,670,310 | B2 * | 3/2014 | Sharma ............... | H04L 47/6215 |
| | | | | 370/232 |
| 9,660,833 | B2 * | 5/2017 | Zawadowskiy ....... | H04L 43/026 |
| 9,686,127 | B2 * | 6/2017 | Ramachandran ... | H04L 41/0668 |
| 9,729,439 | B2 | 8/2017 | MeLampy et al. | |
| 9,729,682 | B2 | 8/2017 | Kumar et al. | |
| 9,762,485 | B2 | 9/2017 | Kaplan et al. | |
| 9,871,748 | B2 | 1/2018 | Gosselin et al. | |
| 9,923,773 | B2 * | 3/2018 | Blair .................. | H04L 12/4641 |
| 9,985,883 | B2 | 5/2018 | MeLampy et al. | |
| 10,075,347 | B2 * | 9/2018 | Jain .................... | H04L 41/5012 |
| 10,200,264 | B2 | 2/2019 | Menon et al. | |
| 10,277,506 | B2 | 4/2019 | Timmons et al. | |
| 10,432,522 | B2 | 10/2019 | Kaplan et al. | |
| 10,511,691 | B2 * | 12/2019 | Sala ...................... | H04L 41/142 |
| 10,621,075 | B2 * | 4/2020 | Buege ................. | G06F 11/3684 |
| 10,637,733 | B2 * | 4/2020 | Li .......................... | G06F 9/5061 |
| 10,735,279 | B2 * | 8/2020 | Sun ..................... | H04L 41/5041 |
| 10,862,758 | B2 * | 12/2020 | Sethi .................. | H04L 41/0889 |
| 10,979,314 | B2 * | 4/2021 | Tidemann .............. | H04L 41/22 |
| 11,075,824 | B2 | 7/2021 | McCulley et al. | |
| 11,245,622 | B2 * | 2/2022 | Joshi .................. | H04L 47/2425 |
| 11,463,365 | B1 * | 10/2022 | Vasseur ................. | H04L 47/122 |
| 11,563,686 | B2 * | 1/2023 | Shen ..................... | H04L 47/225 |
| 11,729,071 | B1 | 8/2023 | Kolar et al. | |
| 11,770,309 | B2 * | 9/2023 | Paruchuri .............. | H04L 43/20 |
| | | | | 370/236 |
| 12,143,290 | B2 * | 11/2024 | Yelahanka Raghuprasad ............ | |
| | | | | H04L 41/5067 |
| 12,526,685 | B2 * | 1/2026 | Tedaldi ............ | H04W 28/0268 |
| 2014/0198648 | A1 * | 7/2014 | Kulkarni ............ | H04L 47/2441 |
| | | | | 370/235 |
| 2021/0083948 | A1 * | 3/2021 | Paruchuri ........... | H04L 47/6215 |
| 2023/0022959 | A1 | 1/2023 | Dasgupta et al. | |

OTHER PUBLICATIONS

Extended European Search Report, EP App. No. 25215073.5, Apr. 8, 2026, 10 pages.

* cited by examiner

| CUSTOMER | DAY/TIME | SLE EXPECTATION | OBSERVED SLE | COST OF INFRASTRUCTURE/DAY | COMMENTS |
|---|---|---|---|---|---|
| CUSTOMER A (MANUAL MODE) | FRIDAY 10:30PM | 98% | 98% | $20 | ALL GOOD |
|  | SATURDAY 1:00pm (GEO SYNC UP) | 98% | 97% | $20 | LOW COST BUT SLE IS NOT MET |
| CUSTOMER B (UNDER UTILIZED PROVISIONING) | SATURDAY 10:30 PM | 98% | 99% | $50 | HIGH COST DUE TO UNUSED RESOURCES |
| CUSTOMER C (AAAR ENGINE ENABLED) | FRIDAY 10:30PM | 98% | 99% | $15 | LOW COST AND MEETS SLE |
|  | SATURDAY 1:00pm (GEO SYNC UP) | 98% | 99% | $22 | LOW COST AND MEETS SLE |

FIG. 7

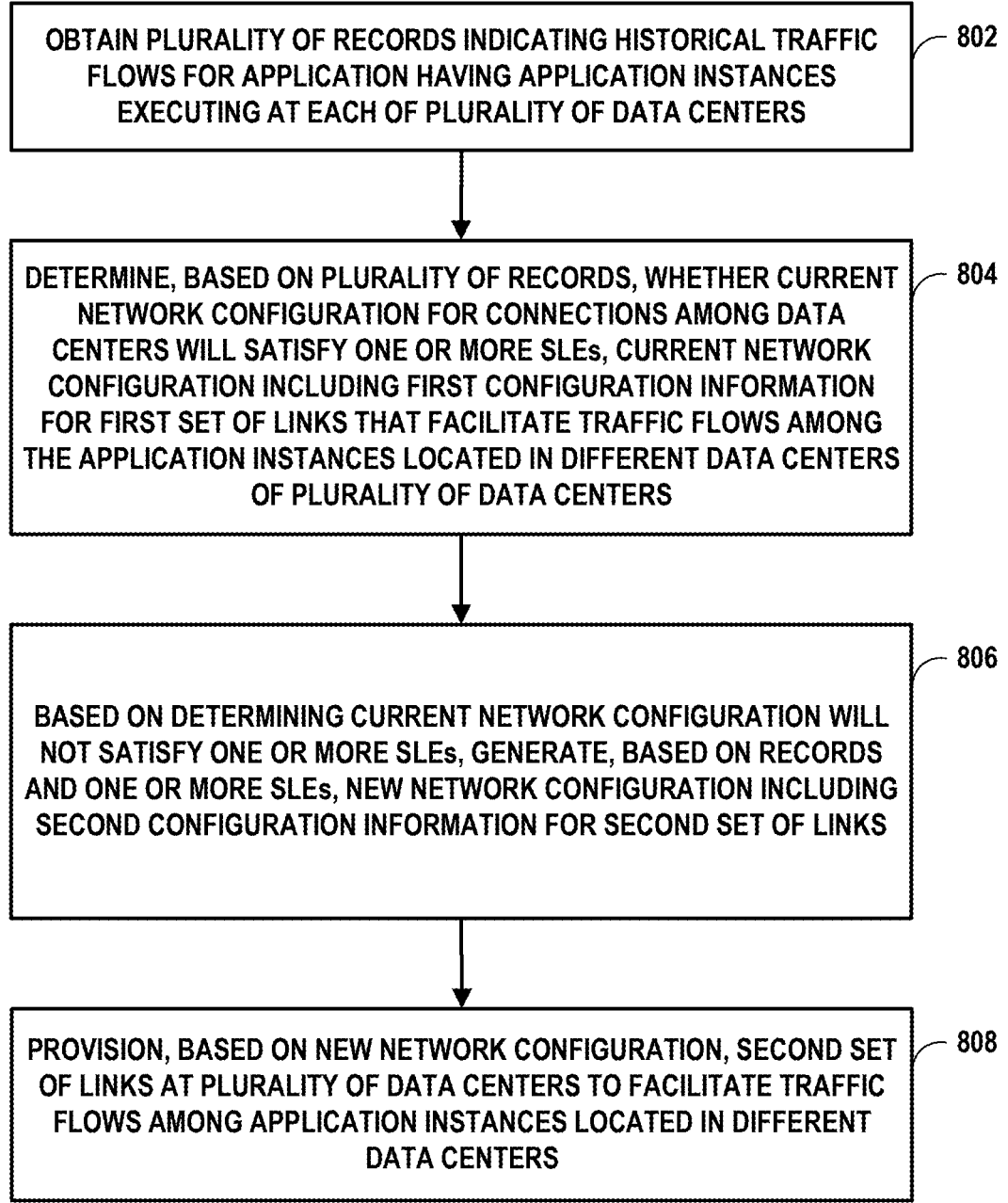

OBTAIN PLURALITY OF RECORDS INDICATING HISTORICAL TRAFFIC FLOWS FOR APPLICATION HAVING APPLICATION INSTANCES EXECUTING AT EACH OF PLURALITY OF DATA CENTERS ⌐ 802

DETERMINE, BASED ON PLURALITY OF RECORDS, WHETHER CURRENT NETWORK CONFIGURATION FOR CONNECTIONS AMONG DATA CENTERS WILL SATISFY ONE OR MORE SLEs, CURRENT NETWORK CONFIGURATION INCLUDING FIRST CONFIGURATION INFORMATION FOR FIRST SET OF LINKS THAT FACILITATE TRAFFIC FLOWS AMONG THE APPLICATION INSTANCES LOCATED IN DIFFERENT DATA CENTERS OF PLURALITY OF DATA CENTERS ⌐ 804

BASED ON DETERMINING CURRENT NETWORK CONFIGURATION WILL NOT SATISFY ONE OR MORE SLEs, GENERATE, BASED ON RECORDS AND ONE OR MORE SLEs, NEW NETWORK CONFIGURATION INCLUDING SECOND CONFIGURATION INFORMATION FOR SECOND SET OF LINKS ⌐ 806

PROVISION, BASED ON NEW NETWORK CONFIGURATION, SECOND SET OF LINKS AT PLURALITY OF DATA CENTERS TO FACILITATE TRAFFIC FLOWS AMONG APPLICATION INSTANCES LOCATED IN DIFFERENT DATA CENTERS ⌐ 808

FIG. 8

APPLICATION AWARE ADAPTIVE ROUTING

TECHNICAL FIELD

The disclosure relates to networked computing infrastructures.

BACKGROUND

In a typical data center environment, there is a large collection of interconnected servers that provide computing and/or storage capacity to run various applications. For example, a data center may include a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities. Applications and services for a distributed application may be distributed among on-premises locations (private data centers), colocation data centers, and public cloud data centers, and such applications and services may utilize network connectivity.

A public cloud data center environment may provide services for any number of customers. For example, a public cloud data center environment may provide services to different customers via virtual private clouds (VPCs). A VPC may be viewed as an extension of a customer operated on-premises (on-prem) network which may be located on the premises of a customer site. As such, through the use of a VPC, a customer may quickly and efficiently scale their on-prem network as needed by adding or subtracting resources resident in a cloud data center through a VPC rather than changing the resources in the on-prem network itself. A VPC implementation may include the use of a virtual private cloud gateway device.

SUMMARY

In general, techniques are described for a network topology management system that addresses the challenges and complexity of network connectivity and security for Hybrid Cloud and Multi-Cloud environments (also referred to herein as "HCMC environments"). The network topology management system assists customers (e.g., enterprises, organizations, corporations, governments, etc.) by determining and provisioning a network topology to facilitate hosted applications distributed across HCMC environments, such as any combination of public clouds, colocation data centers, and on-premises data centers.

The network topology management system may include an application aware adaptive routing (AAAR) engine configured to provision the network topology among HCMC environments and/or network configurations within HCMC environments, while potentially reducing cost expenditures associated with the network topology and/or network configurations. The AAAR engine may configure HCMC environments based on session records indicating network activity associated with applications hosted in the HCMC environments. For instance, the AAAR engine may leverage time series analysis of session records (e.g., obtained from routers operating at data centers of the HCMC environment) of an application to forecast network demands for the application. The AAAR engine may forecast network demands for the application by integrating both historical and real-time network data to identify patterns and trends associated with traffic surges associated with the application. The AAAR engine may implement one or more models trained to output, based on the identified patterns and trends associated with the application, configuration for an improved network topology of the HCMC environment that satisfies service level expectation (SLE) metrics. The AAAR engine may additionally or alternatively output the improved network topology such that costs associated with the HCMC environment is reduced. The network topology management system may, based on the improved network topology, cause links connecting the various HCMC environments to be created, modified, or deleted. In this way, the AAAR engine may proactively mitigate forecasted network congestion to enhance application performance and improve resource utilization to ultimately reduce operational costs and improve network resiliency in HCMC environments.

The techniques of the disclosure may provide specific improvements to the computer-related field of networked computing infrastructures that have one or more practical applications. For example, the AAAR engine may accurately suggest and implement network configurations for hybrid cloud or multi-cloud environments to support operations of applications having application instances executing at the hybrid cloud multi-cloud environment such that service level expectations (SLEs) associated with application networking are satisfied. The AAAR engine may suggest and implement network configurations that consider financial implications of executing application instances of the applications (e.g., cloud spending, unexpected charges, etc.) to create the network configurations to that adjust resource allocation in a cost-effective manner. As cloud computing continues to evolve, the AAAR engine may be a vital component that enables administrators of hybrid cloud or multi-cloud environments to improve network topology to meet SLEs and reduce operational costs.

In one example, a computing system comprising processing circuitry having access to a memory, the processing circuitry configured to: obtain a plurality of records indicating historical traffic flows for an application having application instances executing at each of a plurality of data centers; determine, based on the plurality of records, whether a current network configuration for connections among the plurality of data centers will satisfy one or more service level expectations (SLEs) for the application, the current network configuration including first configuration information for a first set of links that facilitate traffic flows among the application instances located in different data centers of the plurality of data centers; and based on determining the current network configurations will not satisfy the one or more SLEs for the application: generate, based on the plurality of records and the one or more SLEs, a new network configuration including second configuration information for a second set of links, and provision, based on the new network configuration, the second set of links at the plurality of data centers to facilitate the traffic flows among the application instances located in different data centers of the plurality of data centers.

In another example, this disclosure describes a method comprising: obtaining, by a cloud management system, a plurality of records indicating historical traffic flows for an application having application instances executing at each of a plurality of data centers; determining, by the cloud management system and based on the plurality of records, whether a current network configuration for connections among the plurality of data centers will satisfy one or more service level expectations (SLEs) for the application, the current network configuration including first configuration information for a first set of links that facilitate traffic flows among the application instances located in different data centers of the plurality of data centers; and based on determining the current network configurations will not satisfy the one or more SLEs for the application: generating, by the cloud management system and based on the plurality of records and the one or more SLEs, a new network configuration including second configuration information for a second set of links, and provisioning, by the cloud management system and based on the new network configuration, the second set of links at the plurality of data centers to facilitate the traffic flows among the application instances located in different data centers of the plurality of data centers.

In another example, this disclosure describes non-transitory, computer-readable media comprising instructions that, when executed, are configured to cause processing circuitry to: obtain a plurality of records indicating historical traffic flows for an application having application instances executing at each of a plurality of data centers; determine, based on the plurality of records, whether a current network configuration for connections among the plurality of data centers will satisfy one or more service level expectations (SLEs) for the application, the current network configuration including first configuration information for a first set of links that facilitate traffic flows among the application instances located in different data centers of the plurality of data centers; and based on determining the current network configurations will not satisfy the one or more SLEs for the application: generate, based on the plurality of records and the one or more SLEs, a new network configuration including second configuration information for a second set of links, and provision, based on the new network configuration, the second set of links at the plurality of data centers to facilitate the traffic flows among the application instances located in different data centers of the plurality of data centers The details of one or more examples of this disclosure are set forth in the accompanying drawings and the description below. Other features, objects, and advantages will be apparent from the description and drawings, and from the claims.

BRIEF DESCRIPTION OF DRAWINGS

FIG. 7 is a table illustrating an example evaluation of features not implementing the techniques described herein and features implementing the techniques described herein.

FIG. 8 is a flow diagram illustrating an example operation of application aware adaptive routing, according to one or more aspects of this disclosure.

Like reference characters denote like elements throughout the description and figures.

DETAILED DESCRIPTION

Figure 1A:
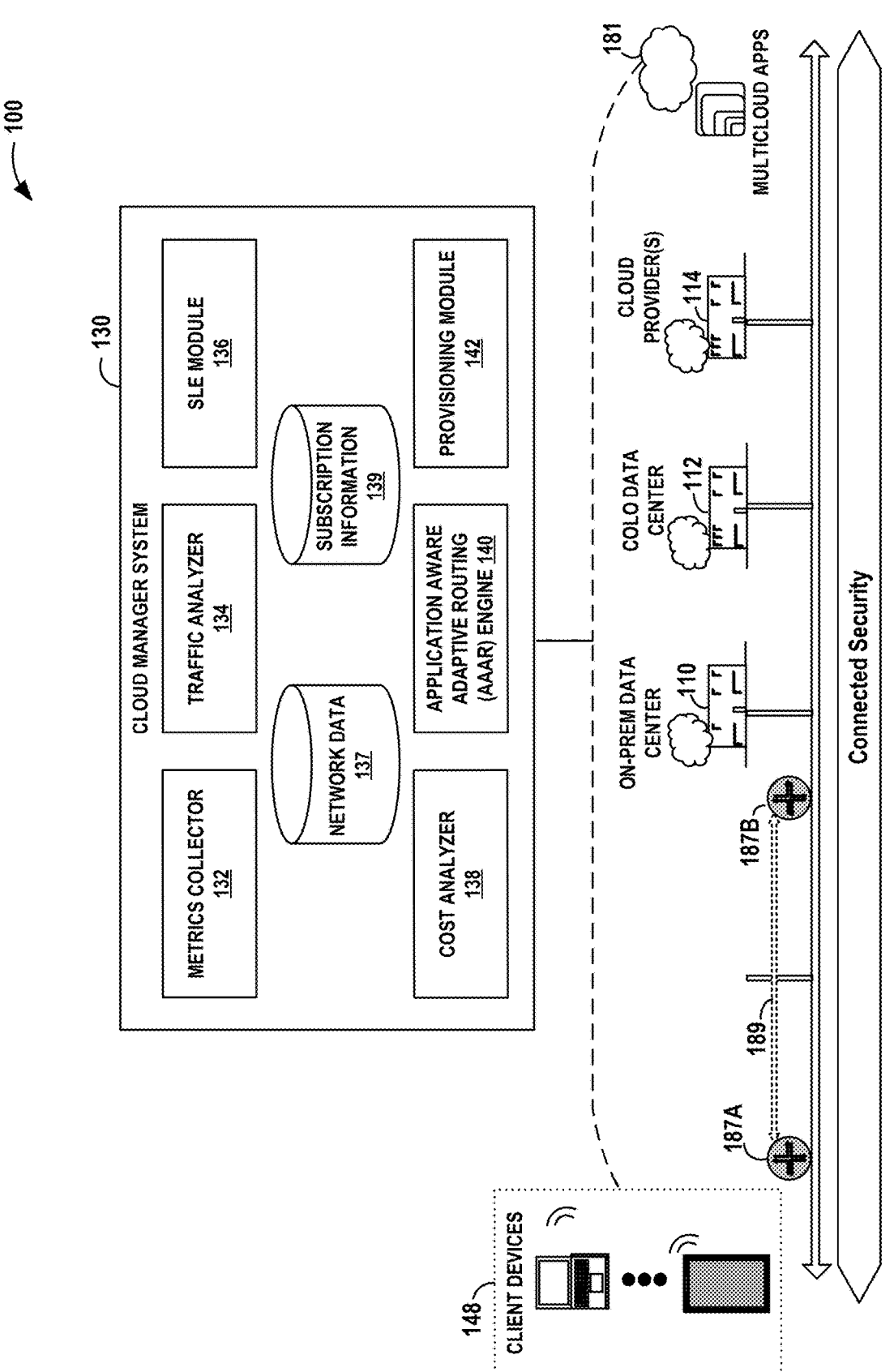
FIG. 1A is a block diagram illustrating an example network system including an example cloud manager system, according to one or more aspects of this disclosure.

Workloads for a distributed application may be distributed in a hybrid or multi-cloud network environment (e.g., any combination of virtual private clouds, VPCs, virtual local area network, VLAN, connections with co-located data centers, VLAN connections with on-premises data centers, etc.). The workloads (also referred to as "application services" or "applications") may include one or more virtual compute instances, such as virtual machines, Kubernetes Pods, or other deployable instances of one or more containers.

Multi-cloud networking has become crucial for organizations, as evident by the widespread adoption of multi-cloud and/or hybrid architectures for distributed applications. Some benefits of multi-cloud architectures include efficient management of resources and cost. For example, services can be selected from different cloud providers based on specific needs and usage costs. In addition, the use of multi-cloud architectures avoids vendor lock in. Furthermore, multi-cloud architectures may provide improved risk mitigation, because the distribution of workloads across multiple clouds reduces the impact of single-point failures, therefore ensuring operational continuity during cloud outages. In addition, multi-cloud architectures may provide improved performance by leveraging cloud services based on geographical proximity to users, which may reduce latency and improve application performance.

Almost all cloud providers offer logically isolated networks. For example, AMAZON WEB SERVICES (AWS) refers to such logically isolated networks as Virtual Private Clouds (VPCs), while MICROSOFT AZURE refers to such logically isolated networks as Virtual Networks. For purposes of consistency, logically isolated networks provided by a cloud provider are referred to with respect to the example of VPCs. However, the techniques of the disclosure may be applied with any logically isolated network provided by a cloud provider, and the use of the term "VPC" herein refers generally to such logically isolated networks, and not to a specific implementation by a specific service provider.

A multi-cloud network may involve connecting one or more VPCs belonging to the same or different public or private clouds, on-premises locations, private clouds, networks in colocation data centers, and other HCMC environments. Applications (and workloads thereof) distributed among these various locations are then able to communicate with applications (and workloads thereof) without consideration to the location or cloud upon which the applications are hosted. Cloud providers may provide numerous ways within their own clouds to connect VPCs with one another or with private data centers. An organization that wishes to leverage multi-cloud architectures may struggle to understand the myriad services or techniques a cloud provider offers to connect VPCs, as well as the cost implication of each, taking into account evolving usage or the communication pattern of the organization's application workloads. Moreover, each application behaves differently. Larger organizations with centralized information technology (IT) teams may find it difficult to switch between cloud connectivity services based on the usage pattern of individual applications so as to reduce the overall cloud provider costs and enhance application network performance.

FIG. 1A is a block diagram illustrating example network system 100 including example cloud manager system 130, according to one or more aspects of this disclosure. Example network system 100 may include cloud manager system 130, client devices 108, spoke routers 187A, hub routers 187B, on premises (on-prem) data center 110, colocation (colo) data center 112, one or more cloud providers 114, and application services 181. Client devices 148, otherwise known as user equipment devices (UEs), may represent various wireless-enabled devices within a network site. Client devices 148 may include any type of wireless client device, including, but not limited to, a mobile device such as a smart phone, tablet or laptop computer, a personal digital assistant (PDA), a wireless terminal, a smart watch, smart ring, or other wearable device. Client devices 148 may also include wired client-side devices, e.g., desktop computers, storage or compute servers, IoT devices such as printers, security devices, environmental sensors, or any other device connected to one or more networks.

Routers 187A, 187B may dynamically modify contents of original packet headers sourced by client devices 148 to steer traffic along selected paths, e.g., path 189, toward application services 181 without the use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without the use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871, 748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

On-prem data center 110 may include a data center located within a customer's physical premises that houses servers, storage systems, networking equipment, or other computational hardware owned by the customer. The customer or organization owning on-prem data center 110 may manage the infrastructure and operation of devices within on-prem data center 110. Examples of on-prem data center 110 may include a corporate data center, a government data center, a healthcare data center, a manufacturing or industrial data center, or the like. "Data center" refers to any location, regardless of form (e.g., an office, data closet, etc.), at which application services 181 execute or relevant data is stored. The customer owning on-prem data center 110 may develop application services 181. (In some examples, the customer does not have an on-prem data center 110.) Application services 181 may include applications that support data management, data security, business operations, or any other function associated the customer and/or clients of the customer. For example, application services 181 may include applications that support machine learning platforms, network and security services, such as virtual interfaces and load balancing, analytics tools, collaboration tools, or any other application service that may be executed at one or more of data centers 110, 112, 114.

In some examples, the customer may lease resources from colo data center 112 and/or one or more cloud providers 114. For example, to reduce operational costs or perform data management operations, the customer may lease resources from colo data center 112 to support operations of application services 181. Colo data center 112 may include a data center that the customer may rent or lease to host application services 181. The customer may additionally or alternatively subscribe to cloud providers 114 to host and/or support operations of application services 181. Cloud providers 114 may include public clouds that offer computing resources (e.g., storage, servers, database, networking resources, etc.) to the customer on-demand. Cloud providers 114 may provide on-prem data center 110 cloud computing resources (e.g., servers, storage, networking, etc.) over a network, such as the Internet. Cloud providers 114 may offer a range of computing, storge, and networking resources that the customer may use on a pay-per-use basis. Cloud providers 114 may offer the customer of on-prem data center 110 a range of services, such as virtual machines, databases, machine learning tools, which the customer may leverage to build and deploy application services 181.

Cloud manager system 130 may provide, to the customer, software-based tools such as tools for cloud connect as a service. Cloud manager system 130 may provide software-based services that address challenges and complexity of network connectivity and security for hybrid cloud and multi-cloud environments (e.g., any combination of on-prem data center, colo data center, and/or one or more cloud providers 114) at scale with fully integrated network and security stacks. For example, cloud manager system 130 may provision network links among data centers 110, 112, 114 to host or otherwise support operations of application services 181.

Cloud manager system 130 may include metrics collector 132, traffic analyzer 134, service level expectation (SLE) module 136, cost analyzer 138, application aware adaptive routing (AAAR) engine 140, provisioning module 148, network data 137, and subscription information 139. Metrics collector 132 may monitor and collect network data 137 and/or subscription information 139. For example, metrics collector 132 may deploy agents or services to execute at routers of data centers 110, 112, 114 that route network traffic for application instances executing at data centers 110, 112, 114. Metrics collector 132 may monitor and collect, via the agents or services, network data 137 associated with application services 181 having application instances executing at data centers 110, 112, 114 as session records from routers routing network traffic for data centers 110, 112, 114. Additionally, or alternatively, metrics collector 132 may collect cost information associated with data centers 110, 112, 114, such as processing utilization, memory usage, disk input/output (I/O), or other financial implications associated with on-prem data center 110 and/or daily cost data associated with colo data center 112 and/or one or more cloud providers 114. Metric collector 132 may store the cost information as subscription information 139.

Other cost information stored as subscription information 139 may include costs for data transit costs. Data transit costs include ingress (data entering the data center/cloud) and egress (data leaving the data center/cloud). Data transit costs may include a periodic fee for a connection and/or fees for amounts of data transferred. Data egress costs may include costs for outbound data transfer via the Internet (typically the most expensive), cross-region data transfer (between geographic regions where the same cloud provider has data centers), and transfer between availability zones/data centers within a region. Data ingress costs are often free, but they may include costs associated with specific services or if the data is moved across multiple regions or zones after entry. Other data transit costs may include inter-cloud transfer between different cloud providers, Content Delivery Network (CDN) costs, data transfer acceleration costs where cloud providers offer services to speed up data transfers, such as AWS DIRECT CONNECT or GOOGLE CLOUD INTERCONNECT. These can be more cost-effective for high volumes of data transfer but may involve setup, port, and usage fees. Private connections (e.g., AZURE EXPRESSROUTE or AWS DIRECT CONNECT) instead of the public internet also include associated costs, such as subscription and port charges. Finally, peering connections within a cloud provider network can reduce egress costs but may still have associated per-GB fees. Subscription information 139 may include costs for any one or more of the above data transit and connectivity options.

As previously discussed, the customer that owns on-prem data center 110 may purchase resources from colo data center 112 and/or cloud providers 114 to host or otherwise support operations of application services 181. (In some examples, the customer may not have application instances located in an on-prem data center 110.) However, configurations associated with routing network traffic for application instances of application services 181 executing at data centers 110, 112, 114 may not meet service level expectations (SLEs) established by the customer (e.g., a number of allowable packet drops, bandwidth thresholds, network criteria, service availability thresholds, performance indicator conditions, user experience criteria, etc.). For example, the customer may manually provision links interconnecting data centers 110, 112, 114 to host application services 181, which may result in extensive manual effort and/or sub-optimal network topology associated with data centers 110, 112, 114. Configurations for the links interconnecting data centers 110, 112, 114 may result in underutilized provisioning (e.g., unused resources) and/or high operational costs.

In accordance with the techniques described herein, cloud manager system 130 may determine a network topology for data centers 110, 112, 114 hosting, or otherwise supporting operations of, application services 181. Metrics collector 132 of cloud manager system 130 may collect sessions records or logs that indicate historical traffic flows associated with application services 181 having application instances executing at one or more of data centers 110, 112, 114. Metrics collector 132 may store sessions records for application services 181 as network data 137. Traffic analyzer 134 may continuously monitor network data 137 to determine traffic metrics associated with application services 181, such as bandwidth, jitter, latency, packet loss, and throughput. Traffic analyzer 134 may provide the traffic metrics associated with application services 181 to AAAR engine 140 and SLE module 136. SLE module 136 of cloud manager system 130 may determine, based on the traffic metrics, one or more SLE metrics as indications of whether network performance associated with application services 181 satisfy one or more SLEs associated with application services 181, such as user experience, service availability, performance indicators, uptime, latency thresholds, or other metrics associated with business objectives of the customer. SLE module 136 may provide the one or more SLE metrics to AAAR engine 140.

AAAR engine 140 may process the traffic metrics and SLE metrics to predict network conditions for application services 181 and dynamically adjust network topology of links interconnecting data centers 110, 112, 114. AAAR engine 140 may determine whether a current network configuration for connections among data centers 110, 112, 114 will satisfy one or more SLEs, such as an allowable number of packet drops, bandwidth thresholds, latency thresholds, service availability criteria, or other performance indicators associated with the connections among data centers 110, 112, 114 and/or the operation of application services 181 in general. The current network configuration for connections among data centers 110, 112, 114 may include, at a time network data 137 is collected, network policies to create, maintain, remove, or otherwise modify various types of network links that facilitate traffic flows for application instances of application services 181 executing at data centers 110, 112, 114. AAAR engine 140 may implement one or more machine learning models trained to determine whether the current network configuration will satisfy one or more SLEs within a future time window. For example, AAAR engine 140 may implement the one or more machine learning models to predict, based on session records of network data 137 indicating historical traffic flows of an application service of application services 181, that traffic flows associated with the application spikes or is otherwise increased at a time period that corresponds to a consistent time window (e.g., Mondays from 9:00 AM-9:14 AM). AAAR engine 140 may determine whether the current network configuration for connections among data centers 110, 112, 114 may support traffic flows of the application within the consistent time window such that the one or more SLEs are satisfied or are otherwise not violated. For instance, AAAR engine 140 may determine the current network configuration may violate the one or more SLEs (e.g., allowable number of packet drops) based on policies for the types of network links indicated in the current network configuration (e.g., the current network configuration indicating a policy to maintain a five gigabyte link on Mondays between on-prem data center 110 and cloud provider 114, which may result in network congestion within the consistent time window such that the one or more SLEs are not satisfied).

Based on AAAR engine 140 determining the current network configuration will not satisfy one or more SLEs associated with an application service of application services 181, AAAR engine 140 may generate a new network configuration including new configuration information for links interconnecting data centers 110, 112, 114. AAAR engine 140 may generate the new network configuration to include configuration information indicating network policies for links interconnecting data centers 110, 112, 114. For example, AAAR engine 140 may generate the new network configuration to include configuration information for a policy to provision one or more types of links (e.g., a high-bandwidth link between colo data center 112 and cloud provider 114 to support surge in network traffic associated with the application within a time window) such that the one or more SLEs associated with the application will be satisfied. AAAR engine 140 may generate the new network configuration such that the one or more SLEs associated with the application will not be violated, as well as not affecting normal operations of the application (e.g., normal traffic parameters associated with syncing or backing up data). For instance, AAAR engine 140 may determine a baseline bandwidth associated with normal operations of the application. AAAR engine 140 may implement one or more machine learning models to generate configuration information for the application based on the one or more SLEs associated with the application, as well as the baseline bandwidth associated with the application. In this way, AAAR engine 140 may determine a network topology of connections among data centers 110, 112, 114 such that SLEs associated with application services 181 are not violated and normal operation of application services 181 is not disturbed.

In some examples, AAAR engine 140 may additionally or alternatively generate new network configurations such that cost expenditures associated with the application are improved. AAAR engine 140 may employ cost analyzer 138 to evaluate financial implications of various network configurations. For example, cost analyzer 138 may process subscription information 139 to determine whether new network configurations generated by AAAR engine 140 are improved from a cost standpoint. Cost analyzer 138 may implement machine learning techniques to predict, based on subscription information 139, financial implications associated with new network configuration generated by AAAR engine 140. Cost analyzer 138 may output the financial implications to AAAR engine 140. AAAR engine 140 may update the new network configuration to reduce (and in some cases minimize) cost expenditures associated with the financial implications, while satisfying one or more SLEs associated with application services 181 and supporting normal operations of application services 181. AAAR engine 140 may send the new network configuration to provisioning module 142.

Provisioning module 142 may provision links interconnecting data centers 110, 112, 114 and implement a policy according to new network configuration generated by AAAR engine 140. Provisioning module 142 may provision the links using an interface (e.g., a KUBERNETES Cross Plane tool, an application programming interface associated with colo data center 112 or cloud providers 114, etc.) to interact with gateway routers of data centers 110, 112, 114. Provisioning module 142 may implement the policy indicated in the new network configuration by sending the policy to the routers interconnecting data centers 110, 112, 114. For example, provisioning module 142 may send a policy to routers interconnecting data centers 110, 112, 114 that indicates which applications of application services 181 should use which links for respective network traffic, and at which times.

The techniques may provide one or more technical advantages that realize one or more practical applications. For example, cloud manager system 130 may dynamically improve network performance for application services 181. Traditional networks may be inflexible in a way that manual adjustments may be consistently implemented to support operations and meet demands for cloud-based applications, resulting in inefficient hybrid cloud or multi-cloud infrastructure management. These traditional networks may offer limited visibility into traffic patterns or costs associated with hosting cloud-based applications within the hybrid cloud or multi-cloud environment, increasing the challenge of manually adjusting the network topology of the hybrid cloud or multi-cloud infrastructure to meet demands associated with hosting cloud-based applications. Cloud manager system 130 may, according to the techniques described herein, dynamically improve a network topology of network links among data centers 110, 112, 114 to satisfy SLEs for application services 181 by predicting future conditions associated with application services 181 (e.g., network demands for application services 181, operations of application services 181, etc.) to provision links interconnecting data centers 110, 112, 114. Cloud manager system 130 may dynamically improve the network topology by implementing policies throughout data centers 110, 112, 114 that may indicate scheduling the utilization of the provisioned links for network traffic associated with application services 181. In this way, cloud manager system 130 may automatically improve network performance associated with application services 181 without constant manual adjustments.

Cloud manager system 130 may additionally or alternatively improve cost implications associated with hosting application services 181 at data centers 110, 112, 114. Cloud manager system 130 may adjust configurations associated with provisioned links or policies that improve network performance of application services 181 by considering financial implications associated with the provisioned links or policies. In this way, cloud manager system 130 may proactively mitigate network congestion associated with network traffic of application services 181, enhance performance of application services 181, improve resource utilization associated with hosting application services 181, and reduce cost expenditures associated with hosting application services 181; thereby reducing operational costs and improving network resiliency associated with application services 181.

Figure 1B:
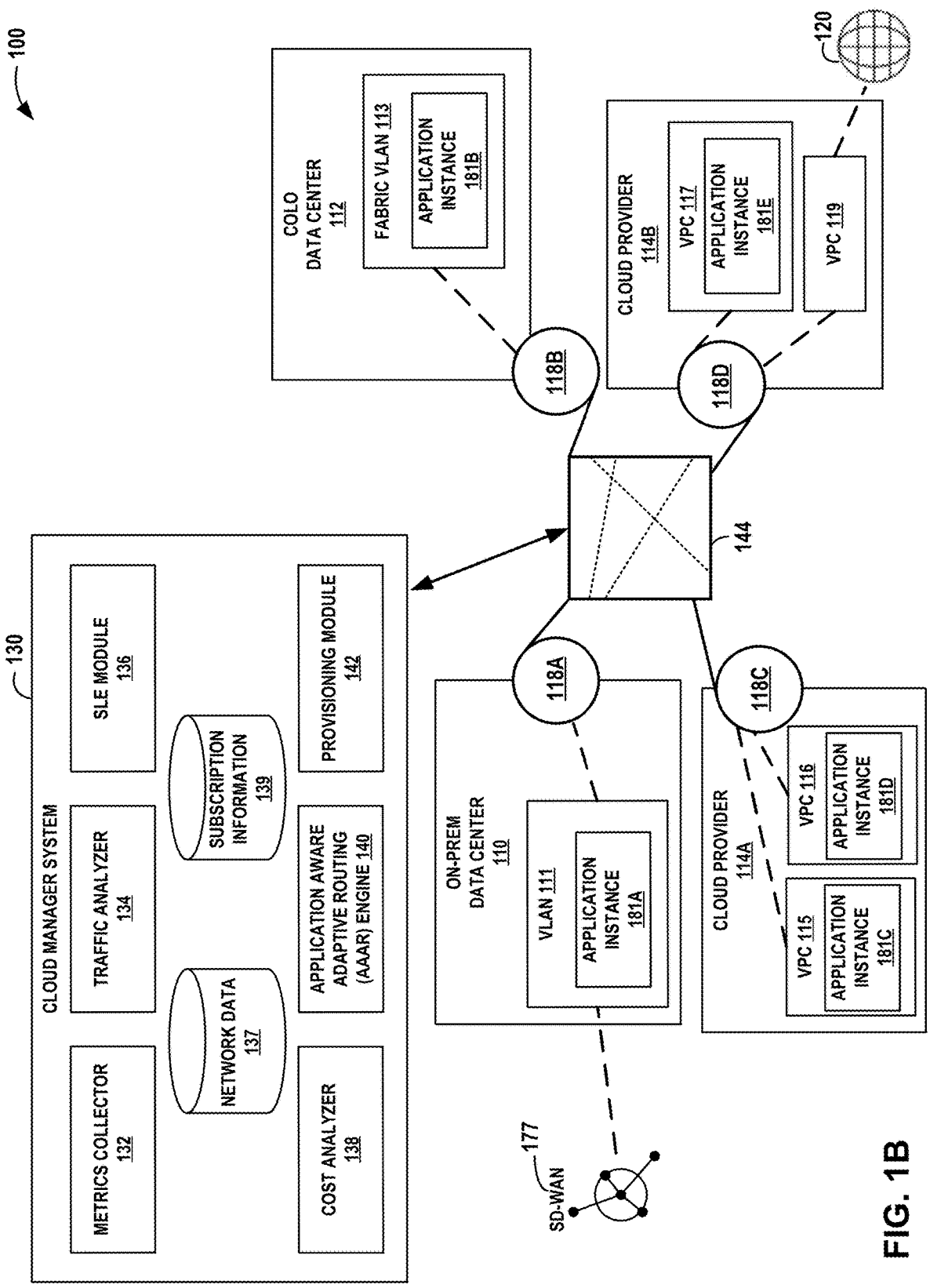
FIG. 1B is a block diagram illustrating further example details of the example cloud manager system of FIG. 1A for application aware adaptive routing for example application instances executing at example data centers, according to one or more aspects of this disclosure.

FIG. 1B is a block diagram illustrating further example details of example cloud manager system 130 of FIG. 1A for application aware adaptive routing for example application instances 181A-181E executing at example data centers 110, 112, 114A-114B, according to one or more aspects of this disclosure. As illustrated in the example of FIG. 1B, cloud manager system 130 may configure network links 144 among on-prem data center 110, colo data center 112, cloud provider 114A, and/or cloud provider 114B. Network links 144 may include various types of links (e.g., virtual private network links, partner interconnect links, dedicated cloud connection links, cloud router links, etc.), provisioned by cloud manager system 130, that interconnect on-prem data center 110, colo data center 112, cloud provider 114A, and cloud provider 114B. The various types of links of network links 144 may be associated with different protocols, applications, and/or financial implications. For example, a virtual private network link of network links 144 interconnecting on-prem data center 110 to colo data center 112 may be provisioned differently and/or cost more than a dedicated cloud connection link of network links 144 interconnecting on-prem data center 110 to cloud provider 114B.

In the example of FIG. 1B, virtual local area network (VLAN) 111, fabric VLAN 112, VPC 115, VPC 116, and VPC 117 may execute application instances 181A-181E, respectively, which correspond to instances of application services 181 of FIG. 1A. On-prem data center 110 may implement VLAN 111 connected to SD-WAN 177. Although SD-WAN 177 may include SD-WAN network topologies, SD-WAN 177 may include other types of multi-cloud connectivity over a network. These include VPNs configured over the Internet or other layer 3 network, private connections between clouds, dedicated network connections (e.g., AWS DIRECT CONNECT), direct Internet access, or other types of connections that may be provisioned between two or more HCMC environments.

VLAN 111 may include a virtual LAN that may determine which VPC networks can reach on-prem data center 110 using networking protocols (e.g., BGP). Colo data center 112 may implement fabric VLAN 113. Fabric VLAN 113 may include a data center fabric that establishes virtual connections or an exchange among colo data center 112 and data centers 110, 114A, 114B. Cloud provider 114A may implement VPC 115 and VPC 116 and cloud provider 114B may implement VPC 117 and VPC 119, where VPC 119 is connected to network 120 such as the Internet. VPCs 115, 116, 117, 119 may include spoke VPCs for building, deploying, hosting, or otherwise supporting application services 181. For example, VPCs 115, 116, 117, 119 may offer services (e.g., virtual machines, databases, machine learning tools, etc.) that a customer may use for application services 181.

On-prem data center 110, colo data center 112, cloud provider 114A, and cloud provider 114B may include routers 118A-118D (collectively referred to herein as "routers 118"), respectively. In some instances, routers 118 may include network devices interconnecting data centers 110, 112, 114A, 114B that are configured to send session records to cloud manager system 130. For example, routers 118 may include session routers that communicate with transit or other cloud-based gateways of data centers 110, 112, 114A, 114B to establish network links 144. In some examples, routers 118 may include virtual routers executed within transit virtual private clouds (VPCs) and/or virtual local area networks (VLANs) created at data centers 110, 112, 114A, 114B. Routers 118 may create links 144 using transit gateways executing within respective transit VPCs. Routers 118 may communicate via links 144 using a protocol such as segment vector routing.

In accordance with the techniques described herein, cloud manager system 130 may improve network performance for application instances 181A-181E executing at data centers 110, 112, 114A, 114B. Metrics collector 132 may obtain session records from routers 118. For example, routers 118 may collect, using a collection agent or plugin (e.g., telegraf, cloud watch exporter, etc.), time-series data indicating traffic flows associated with application instances 181A-181E. Routers 118 may collect the time-series data as logs associated with VLAN 11, fabric VLAN 113, VPCs 115-117, and/or associated transit VPCs and transit gateways. In some examples, routers 117 may collect the time-series data as session records indicating a destination address, a source address, a protocol, ports, a number of packets, errors, or other session statistics associated with traffic flows of application instances 181A-181E. Routers 118 may generally collect the time-series data as raw data indicating a network performance associated with application instances 181A-181E transmitting data via links 144. Routers 118 may send the time-series data of session records to a microservice executing at metric collector 132. Metrics collector 132 may store the time-series data as network data 137.

Traffic analyzer 134 and SLE module 136 may process time-series data of network data 137 to determine traffic metrics and SLE metrics, respectively, for historical traffic flows of application instances 181A-181E indicated in session records of the time-series data. Traffic analyzer 134 and SLE module 136 may determine traffic metrics and SLE metrics for the historical traffic flows with indications of sources, destinations, and a volume of data (e.g., how many packets) associated with network traffic transmitted via links 144, as well as a type of link associated with links 144. For example, traffic analyzer 134 may determine traffic metrics (e.g., bandwidth, jitter, latency, packet loss, throughput, etc.) with an indication that the source is on-prem data center 110, the destination is cloud provider 114A, and a certain number of packets for application instance 181A have been transmitted using a 20 gigabit (Gb/s) Direct Connect (DXC) link of links 144. SLE module 136 may, for example, determine SLE metrics of network performance associated with application instances executing via links 144 as values indicating SLEs, such as values indicating a service availability of the application, values indicating a user experience operating the applications, performance indicators developed for the applications (e.g., indicators associated with whether traffic metrics satisfy latency thresholds, allowable packet drop thresholds, etc.), or other metrics indicating performance of the applications. Traffic analyzer 134 and SLE module 136 may send the determined traffic metrics and SLE metrics to AAAR engine 140.

AAAR engine 140 may process the traffic metrics and SLE metrics to determine whether to generate new network configurations. For example, AAAR engine 140 may implement one or more machine learning models to predict, based on the traffic metrics, network conditions associated with traffic flows for application instances 181A-181E. AAAR engine 140 may determine, based on the predicted network conditions, whether a current network configuration associated with links 144 will satisfy one or more SLEs (e.g., packet loss threshold, latency threshold, etc.). For example, AAAR engine 140 may implement the one or more machine learning models to predict traffic metrics associated with a customer synchronizes large amounts of data for application instances 181A-181E periodically (e.g., every Saturday) among geographically distributed data centers of on-prem data center 110, colo data center 112, cloud providers 114A, 114B, or any combination thereof. AAAR engine 140 may determine, based on the predicted traffic metrics, whether a current network configuration associated with links 144 (e.g., configuration information for a policy to use links 144 for synchronization of data) satisfies one or more SLEs. For example, AAAR engine 140 may determine that the predicted traffic metrics during a time period (e.g., Saturdays) do not satisfy an SLE indicating an allowable number of packet drops when synchronizing large amounts of data.

AAAR engine 140 may generate new network configurations to improve utilization of links 144 based on a determination that predicted network conditions do not satisfy one or more SLEs. For example, AAAR engine 140 may determine a type of link to provision such that predicted traffic metrics during a time period satisfy the one or more SLEs. AAAR engine 140 may generate the new network configuration to include configuration information indicating the type of link to provision and a policy that routers 118 may implement when routing data using the type of link to provision. For instance, AAAR engine 140 may generate the new network configuration to include a direct connect 10-gigabyte link and a policy indicating that routers 118 are to create the direct connect link 10-gigabyte link on Saturdays for data synchronization, then decommission the direct connect link 10-gigabyte link once the data synchronization is completed. In another example, AAAR engine 140 may generate the new network configuration to include a high-bandwidth direct internet access link and a policy indicating that routers 118 are to create the high-bandwidth direct internet access link during a predicted time period when a surge of network traffic for application instances 181A-181E is expected.

In some examples, AAAR engine 140 may generate the new network configuration to reduce cost expenditures associated with executing application instances 181A-181E. Metrics collector 132 may additionally or alternatively collect cost information for on-prem data center 110, colo data center 112, cloud provider 114A, and cloud provider 114B. For example, metrics collector 132 may include microservices that communicate with interfaces executing at data centers 110, 112, 114A, and 114B that are configured to report data associated with financial implications of transmitting data using network links 144. For example, metrics collector 132 may have microservices that communicate with application programming interfaces (APIs) offered by data centers 110, 112, 114A, and 114B to collect data associated with costs of a current network configuration. Metrics collector may store the data associated with the costs as subscription information 139.

Cost analyzer 138 may process cost information stored at subscription information 139 to inform AAAR engine 140 of financial implications associated with a new network configuration. For example, AAAR engine 140 may send cost analyzer 138 new network configuration determined based on network data 137. Cost analyzer 138 may predict costs of running workloads for application instances 181A-181E according to subscription information 139 and the new network configuration. In other words, cost analyzer 138 may evaluate financial implications of network configurations given cost information stored at subscription information 139. AAAR engine 140 may adjust the new network configuration based on the financial implications determined by cost analyzer 138. For example, AAAR engine 140 may may update the new network configurations to indicate a more cost-effective link type for data synchronization such that SLEs will be satisfied and cost expenditures may be reduced. In another example, AAAR engine 140 may update the new network configuration to indicate an updated policy for routers 118 to use an under-utilized link of links 144 rather than creating a new link when routing traffic for application instances 181A-181E. AAAR engine 140 may send new network configurations to provisioning module 142.

Provisioning module 142 may implement new network configurations. Provisioning module 142 may implement new network configurations by sending instructions to routers 118 to provision certain types of links according to a policy indicated in the new configurations. Routers 118 may store the policy and instructions associated with new network configuration received from provisioning module 142. Routers 118 may create, decommission, or otherwise modify one or more links of links 144 (e.g., using a transit VPC and/or transit gateway) and route traffic for application instances 181A-181E according to the stored policy and instructions. For example, routers 118 may be configured to create a link on Saturdays for data synchronization then decommission the link according to a policy included in new network configuration. In another example, routers 118 may use an existing, under-utilized link of links 144 to support a surge of network traffic on Mondays according to a policy included in new network configuration.

Figure 2:
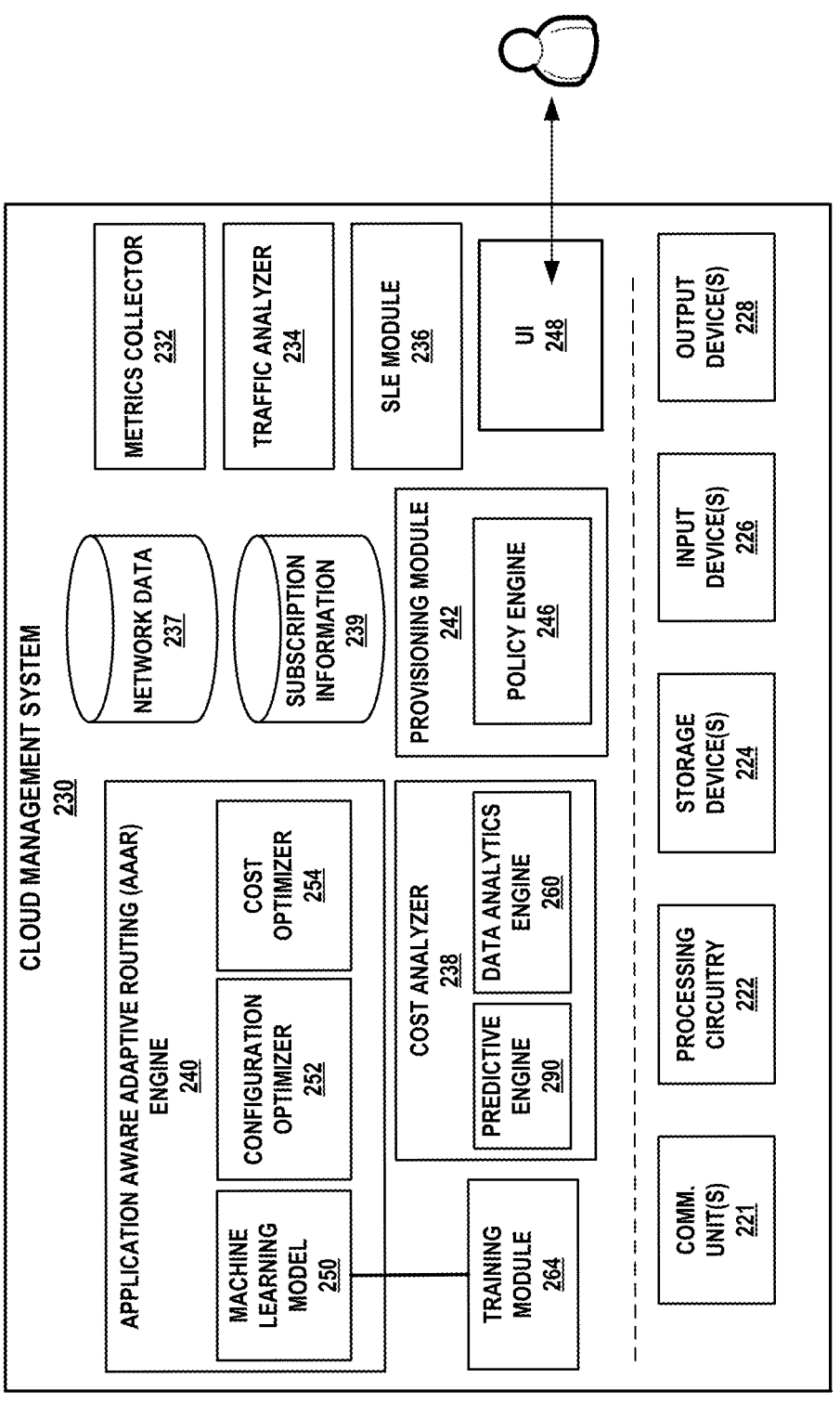
FIG. 2 is a block diagram illustrating an example cloud management system for application aware adaptive routing, according to one or more aspects of this disclosure.

FIG. 2 is a block diagram illustrating an example cloud management system for application aware adaptive routing, according to one or more aspects of this disclosure. Cloud management system 230, metrics collector 232, traffic analyzer 234, SLE module 236, network data 237, cost analyzer 238, subscription information 239, application aware adaptive routing (AAAR) engine 240, and provisioning module 242 of FIG. 2 may be example or alternative implementations of cloud management system 130, metrics collector 132, traffic analyzer 134, SLE module 136, network data 137, cost analyzer 138, subscription information 139, AAAR engine 140, provisioning module 142 of FIG. 1, respectively.

In the example of FIG. 2, cloud management system 230 may include metrics collector 232, traffic analyzer 234, SLE module 236, network data 237, cost analyzer 238, subscription information 239, AAAR engine 240, provisioning module 242, training module 264, user interface (UI) 248, one or more communication units 221, processing circuitry 222, one or more storage devices 224, one or more input devices 226, and one or more output devices 228. Communication unit(s) 221 may include, for example, communication interfaces to couple cloud management system 230 to various cloud infrastructures and/or networks. UI 248 may include a user interface including data output to a user of cloud management system 230 (e.g., a customer using services offered by cloud management system 230). In some examples UI 248 may output data via output device(s) 228 or may send the data to an external device operated by a customer. Output device(s) 228 may generate one or more outputs such as text, audio, and/or video outputs. Output device(s) 228 may include a display device, sound card, video graphics adapter card, speaker, or any other device for generating output to a human or a machine. Input device(s) 226 may receive text, audio, and/or video input. In some examples, input device(s) 226 and output device(s) 228 may include the same devices.

Processing circuitry 222 may execute software instructions, such as those used to define software or computer program, stored to a computer-readable storage medium (such as storage device(s) 224), such as non-transitory computer-readable mediums including a storage device (e.g., a disk drive, or an optical drive) or memory (such as Flash memory or RAM) or any other type of volatile or non-volatile memory, that stores instructions to cause processing circuitry 222 to perform techniques described herein. Storage device(s) 224 may include one or more devices configured to store programming modules and/or data associated with operation of cloud management system 230. For example, storage device(s) 224 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the processing circuitry 222 to perform the techniques described herein.

In accordance with the techniques described herein, cloud management system 230 may improve network topology of hybrid cloud and multi-cloud (also referred to herein as HCMC environments). Cloud management system 230 may determine when HCMC environments may experience network congestion when executing applications, and dynamically generate network configurations for the HCMC environments. AAAR engine 240 of cloud management system 230 may predict network congestion based on traffic metrics and SLE metrics determined by traffic analyzer 234 and SLE module 236, respectively.

AAAR engine 240 may determine an application profile for an application hosted by a HCMC infrastructure that indicates a baseline bandwidth for the application and one or more SLEs associated with network performance of the application. AAAR engine 240 may determine the application profile based on the traffic metrics determined by traffic analyzer 234. For example, AAAR engine 240 may determine the application profile based on throughput, packet loss, and observed bandwidth values for the application determined by traffic analyzer 234. AAAR engine 240 may determine the application profile based on the following equation: application profile=observed bandwidth/e^(−α× packetLossPercent), where α represents a hyperparameter associated with machine learning model 250.

Training module 264 may train machine learning model 250 to predict network congestion associated with executing an application. Training module 264 may create a dataset of session records that are labeled with attributes, such as a source location of a session record, a destination location of the session record, a day of the week associated with the session record, a time associated with the session record, a target variable indicating a baseline bandwidth of an application associated with the session record (e.g., an average bandwidth indicated in an application profile for the application), or the like. Training module 264 may train, using the dataset, machine learning model 250 as a random forest model to consider an average bandwidth baseline of an application. In general, training module 264 may train machine learning model 250 to predict network congestion associated with executing an application based on a baseline bandwidth indicated in an application profile determined for the application.

In some examples, training module 264 may create and provide a dataset to cost analyzer 238 to predict financial implications of particular network topologies. Training module 264 may create a dataset based on traffic metrics and/or SLE metrics for an application hosted by an HCMC environment. For example, training module 264 may generate a dataset with session logs of network data 237 that are labeled with attributes such as application bandwidth shared via a link, a source location, a destination location, types of link (e.g., DXC link, Direct Internet Access link, etc.), SLE metrics associated with the session logs and determined by SLE module 236, and target variables as a provisioned link and/or provisioned link policy. Training module 264 may train, using the dataset, a machine learning model of cost analyzer 238 as a random forest model trained to predict a cost-effective link that satisfies SLEs for given input variables (e.g., bandwidth, latency, jitter, etc.).

In the example of FIG. 2, cost analyzer 238 may include predictive engine 290 and data analytics engine 260. Data analytics engine 260 may pre-process network data 237 and subscription information 239 and extract cost features that may be used to train machine learning models of predictive engine 290. Data analytics engine 260 may perform feature engineering to prepare data processed by predictive engine

290 to predict costs of various network topologies. Data analytics engine 260 may perform feature engineering by, for example, dividing each day cost by the remaining number of days to create a set of features indicating information of cost for a remaining number of days. Data analytics engine 260 may provide the set of features to predictive engine 290 to further train the cost prediction model.

Predictive engine 290 may include machine learning models trained to predict financial implications associated with executing applications according to particular network configurations. In general, predictive engine 290 may utilize machine learning techniques and various type of feature-engineered data to train prediction models to predict costs associated with executing applications in a HCMC environment.

Predictive engine 290 may, in one example, output a predicted monthly bill associated with operational costs of executing applications at a HCMC environment. Predictive engine 290 may predict a monthly bill as an accumulation of daily cost of a current month's bill according to the following equation:

$$\text{bill} = \sum_{d=1}^{d=30} c_d$$

where d represents one day of a month, $c_d$ represents a cost of a day. In some instances, predictive engine 290 may predict the monthly bill further based on geographic regions where a gateway is deployed.

AAAR engine 240 may provide predictive engine 290 new, improved network configurations to determine financial implications of the new network configurations. For example, predictive engine 290 may determine, based on the new network configuration and the predicted monthly bill, a cost for a future day. Predictive engine 290 may determine the cost for the future day using a machine learning model (e.g., a long short-term memory, LSTM, model) to capture temporal patterns of cost data associated with subscription information 239. Predictive engine 290 may predict the cost for remaining days in a month by multiplying the future cost of the future day by the number of remaining days. Predictive engine 290 may determine an average upcoming cost based on the average upcoming cost being inversely proportional to the remaining number of days. For example, predictive engine 290 may determine an average upcoming cost according to the following equation:

$$\text{Average upcoming cost} = \frac{a_1 c_1 + a_2 c_2 + a_3 c_3 \ldots + a_{14} c_{14}}{\text{remaining number of days}}$$

where $a_n c_n$ represent weighted sums of historical data, "a" represents constants that are parameters learned using a trained machine learning model, and "c" represents cost n days from a current time.

In some examples, predictive engine 290 may determine average upcoming costs based on a non-linear equation and/or based on other variables other than daily costs. Predictive engine 290 may define predicted costs of a particular network topology indicated in new network configuration received from AAAR engine 240 as a function of historical daily discounted costs (e.g., discounted by the remaining number of days), location of gateways, and other networking metrics that may be determined by traffic analyzer 234 and/or SLE module 236. For example, predictive engine 290 may determine a predicted cost of new network configuration according to the following equation:

$$PredictedCostC(c_1, c_2 \ldots c_{14}, l_1, l_2 \ldots l_x, m_1, m_2, \ldots, m_y) =$$

linear or non linear combination of independent variables $c$, $l$, and $m$ where c is historical daily discounted costs, l is location of gateways, and m is a network metric. Predictive engine 290 may output, to AAAR engine 240, an indication of a predicted cost the new network configurations may incur when executing applications at a HCMC environment. AAAR engine 240 may update new network configurations based on the indication of the predicted cost. In this way, cloud management system 230 may implement a cost-improved topology for executing applications at HCMC environments that satisfy application operational baselines (e.g., a baseline bandwidth) and one or more SLEs such that links transferring data in the HCMC environments are not over provisioned or under provisioned. In some instances, cloud management system 230 may determine a link is over provisioned based on capacity of a link being at most 80% such that there will not be throttling of service associated with the link.

Provisioning module 242 may provision new network configuration received from AAAR engine 240. In some examples, provisioning module 242 may generate data for a graphical user interface that indicates the new network configuration. For instance, provisioning engine 242 may generate data for a graphical user interface that includes links and corresponding policies that AAAR engine 240 has determined for the network topology. Provisioning module 242 may, in some instances, generate the graphical user interface to allow a user to edit or modify the new network configuration indicated in the graphical user interface. Provisioning module 242 may send the data for the graphical user interface to UI 248. UI 248 may output the graphical user interface to a user. UI 248 may receive an indication from the user approving, modifying, or rejecting the new network configuration. In instances where the user approves or modifies the new network configuration, policy engine 246 of provisioning module 242 may push the new network configuration including any updated policies to routers of an HCMC environment executing applications. In instances where the user rejects the new network configuration, provisioning module 242 may send the rejection, along with any feedback, to AAAR engine 240 to retrain and/or fine-tune network topology determinations.

Figure 3:
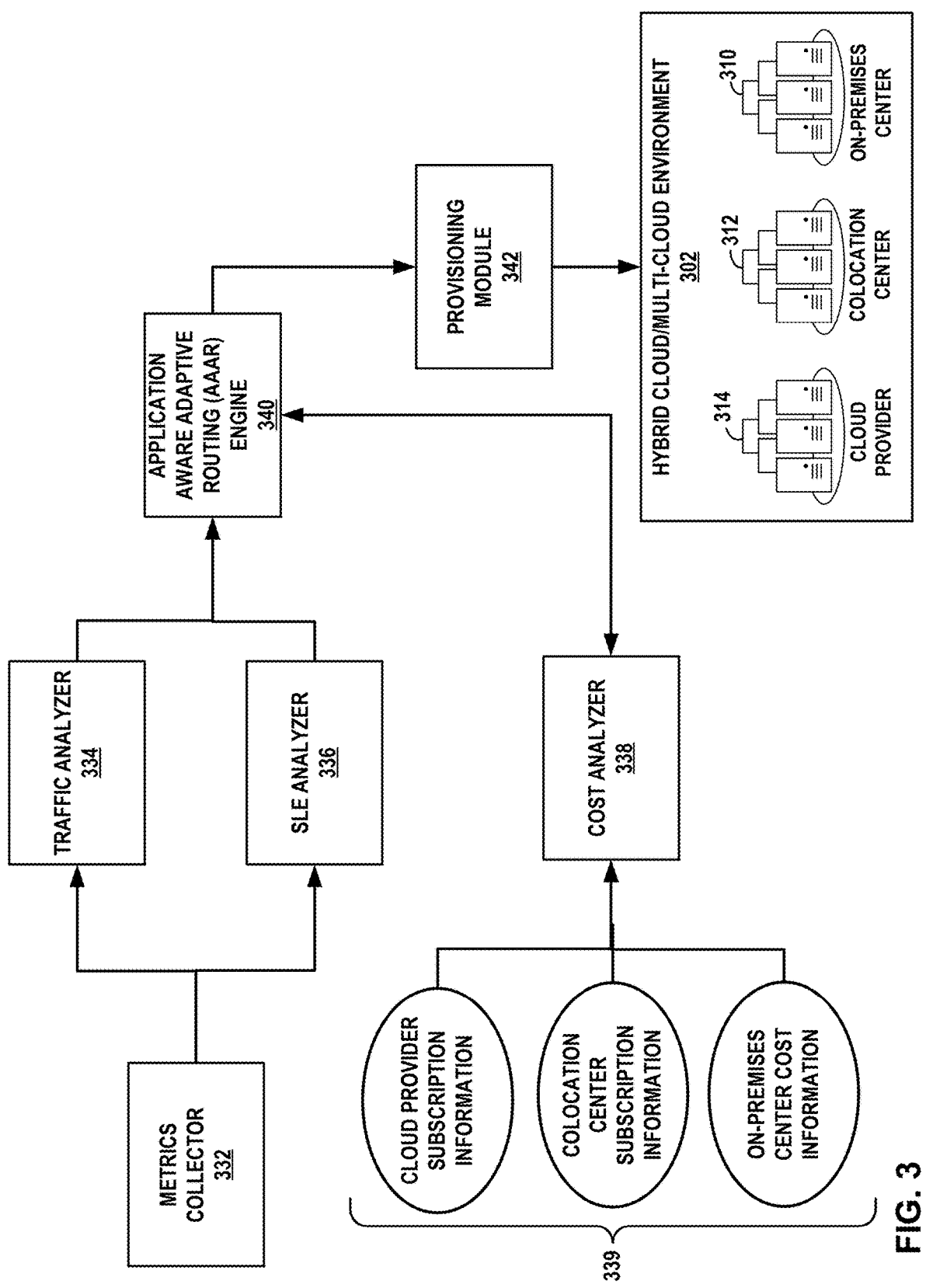
FIG. 3 is a conceptual diagram illustrating an example of application aware adaptive routing, according to one or more aspects of this disclosure.

FIG. 3 is a conceptual diagram illustrating an example of application aware adaptive routing, according to one or more aspects of this disclosure. Metrics collector 332, subscription information 339, traffic analyzer 334, SLE analyzer 336, cost analyzer 338, application aware adaptive routing (AAAR) engine 340, provisioning module 342, on-premises center 310, colocation center 312, and cloud provider 314 of FIG. 3 may be example or alternative implementations of metrics collector 132, subscription information 139, traffic analyzer 134, SLE analyzer 136, cost analyzer 138, AAAR engine 140, provisioning module 142, on-prem data center 110, colo data center 312, and one or more cloud providers 114 of FIG. 1, respectively. As illustrated in the example of FIG. 3, on-premises center 310, colocation center 312, and cloud provider 314 may be included in hybrid cloud/multi-cloud (HCMC) environment 302.

Metrics collector 332 may collect real-time session records from network devices of HCMC environment 302. For example, the metrics collector 332 may collect time-series metric or feature data of from session routers connecting cloud environments of HCMC environment 302. Metrics collector 332 may collect session records that are specific to an application hosted by HCMC environment 302. Metrics collector may send real-time session records of one or more applications hosted by HCMC environment 302 to traffic analyzer 334 and SLE analyzer 336.

Traffic analyzer 334 may continuously monitor traffic metrics indicated in the real-time session records of an application hosted by HCMC environment 302. For example, traffic analyzer 334 may monitor traffic metrics such as bandwidth, jitter, latency, packet loss, and throughput. Traffic analyzer 334 may feed the data indicating the traffic metrics into AAAR engine 340 to ensure that network decisions output by AAAR engine 340 are based on accurate and current information.

SLE analyzer 336 may calculate and monitor Service Level Expectation (SLE) metrics based on the real-time session records of an application hosted by HCMC environment 302 that were obtained from metrics collector 332. For example, SLE analyzer 336 may calculate and monitor SLE metrics such as values indicating user experience, service availability, and performance indicators. SLE analyzer 336 may provide the data indicating the SLE metrics to AAAR engine 340 to guide AAAR engine 340 to make intelligent resource allocation decisions that align with business objectives.

Cost analyzer 338 may evaluate the financial implications of different network configurations. For example, cost analyzer 338 may ingest subscription information 339 including cloud provider subscription information, colocation center subscription information, and on-premises cost information to determine the cost associated with various network configurations. Subscription information 339 may include subscription information similar to that described above with respect to subscription information 139. Cloud provider subscription information may include data indicating costs associated with utilizing one or more cloud providers 314 of HCMC environment 302. Colocation center subscription information may include data indicating costs associated with utilizing one or more colocation centers 312 of HCMC environment 302. On-premises center subscription information may include data indicating costs associated with utilizing one or more on-premises data centers 310 of HCMC environment 302. Cost analyzer 338 may send AAAR engine 340 indications of the determined financial implications to ensure that AAAR engine 340 operates within budget constraints while enhancing performance and reducing operational costs.

AAAR engine 340 is the core of the system configured to determine network topology for one or more applications hosted by HCMC environment 302. AAAR engine 340 may implement one or more machine learning models to process historical and real-time data (e.g., obtained from traffic analyzer 334, SLE analyzer 336, and cost analyzer 338) to predict network conditions for an application associated with the historical and real-time data. AAAR engine 340 may dynamically adjust network topology of HCMC environment 302 to balance the dual goals of maintaining high SLE metrics and reducing costs associated with executing applications at HCMC environment 302. AAAR engine 340 may send an indication of an adjustment to the network topology to provisioning module 342.

Provisioning module 342 may include a cloud interface configured to execute the network adjustments recommended by AAAR engine 340. Provisioning module 342 may create, modify, or terminate network links (e.g., network links 144 of FIG. 1B) based on the network adjustments received from AAAR engine 340. In this way, provisioning module 342 may adjust the network topology of HCMC environment 302 based on current traffic patterns and predicted future demands associated with hosting, or otherwise executing operations, of applications at HCMC environment 302.

Figure 4:
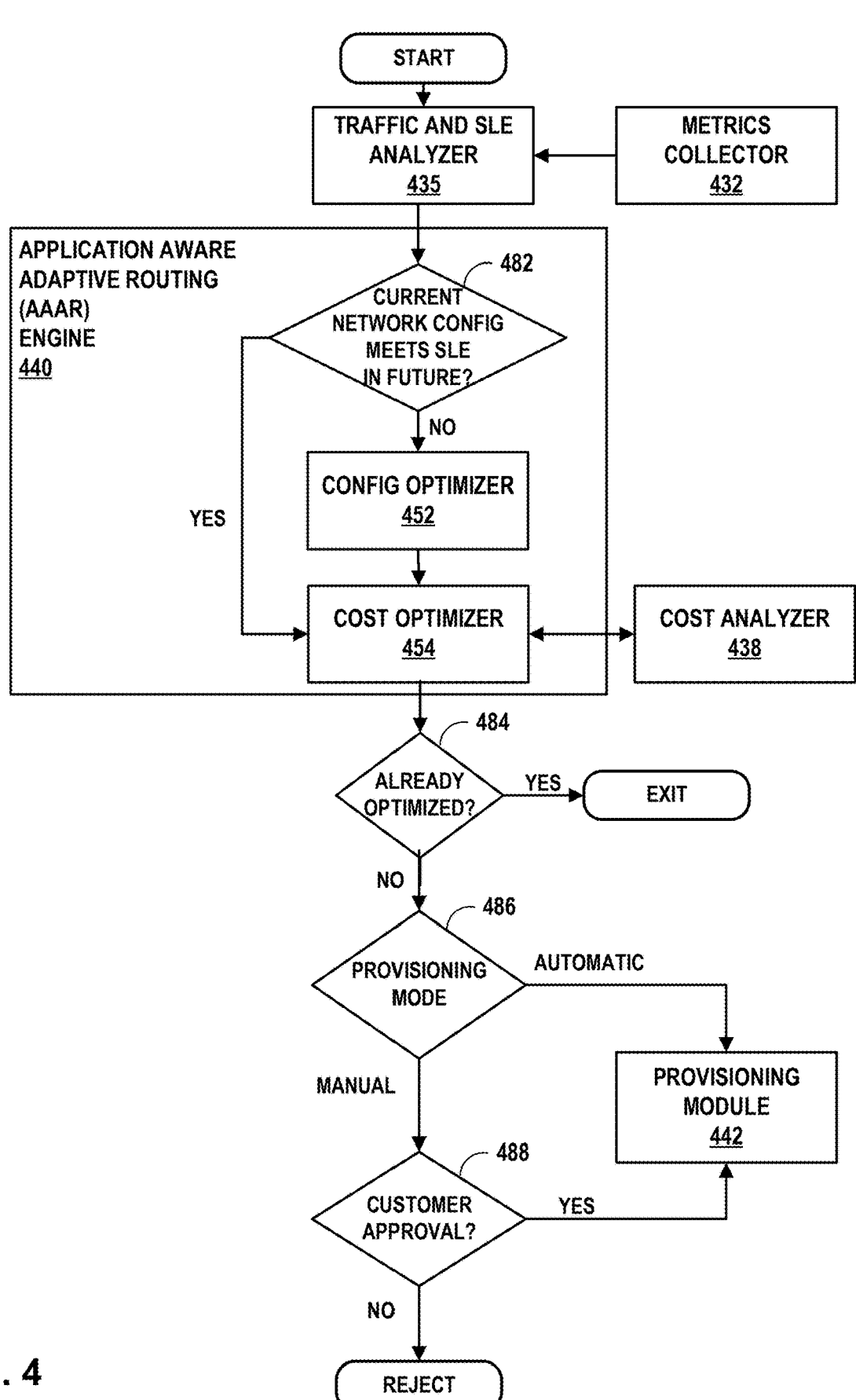
FIG. 4 is a conceptual diagram illustrating an example operation of application aware adaptive routing, according to one or more aspects of this disclosure.

FIG. 4 is a conceptual diagram illustrating an example operation of application aware adaptive routing, according to one or more aspects of this disclosure. Traffic and SLE analyzer 435 of FIG. 4 may be an example or alternative implementation of traffic analyzer 334 and SLE analyzer 336 of FIG. 3. Metrics collector 432, application adaptive routing (AAAR) engine 440, configuration ("config") optimizer 452, cost optimizer 454, cost analyzer 438, and provisioning module 442 of FIG. 4 may be example or alternative implementations of metrics collector 232, AAAR engine 240, configuration optimizer 252, cost optimizer 254, cost analyzer 238, and provisioning module 242 of FIG. 2, respectively.

Traffic and SLE analyzer 435 may receive session records from metrics collector 432. Traffic and SLE analyzer 435 may analyze the flow and metrics data from the metrics collector 432 to send live, current network metrics along with a current topology to AAAR engine 440. AAAR engine 440 may check if the current network topology or network configurations will meet SLEs in the future (482). In instances where AAAR engine 440 determines the current network topology or network configurations meet the SLEs in the future, AAAR engine 440 may directly contact cost optimizer 254. In instances where AAAR engine 440 does not determine that the current network topology or network configurations meet the SLEs in the future, AAAR engine 440 may refer the configurations to config optimizer 452.

Config optimizer 452 may determine a new configuration to send to cost optimizer 454. Cost optimizer 454 may work with cost analyzer 438 to determine the costs of various resources associated with the network topology or network configurations that meet the SLEs in the future. In instances where cost analyzer 438 determines the cost is already optimized, the process ends (YES branch 484). In instances where cost analyzer 438 determines the cost is not optimized, the provisioning mode is assessed (NO branch 484). (As used herein, the term "optimum" and similar derivatives refer to determining a suitable solution and should not be understood as requiring a solution that is better than all other possibilities.) In automatic provisioning mode, the new network topology or network configurations that optimize cost expenditures determined by AAAR engine 440 are sent to provisioning module 442 to implement the new network topology or network configurations within a hybrid cloud or multi-cloud (HCMC) environment (e.g., HCMC environment 302 of FIG. 3) (AUTOMATIC branch 486). In manual provisioning mode, AAAR engine 440 may output the new network topology or network configurations to an administrator for approval (MANUAL branch 486). If the administrator approves the new network topology or network configurations, AAAR engine 440 may send the new network topology or network configurations to provisioning module 442 for implementation within the HCMC environment (YES branch 488). If the administrator rejects the new network topology and network configurations, AAAR engine 440 may note the rejection and end the process (NO branch 488).

Figure 5:
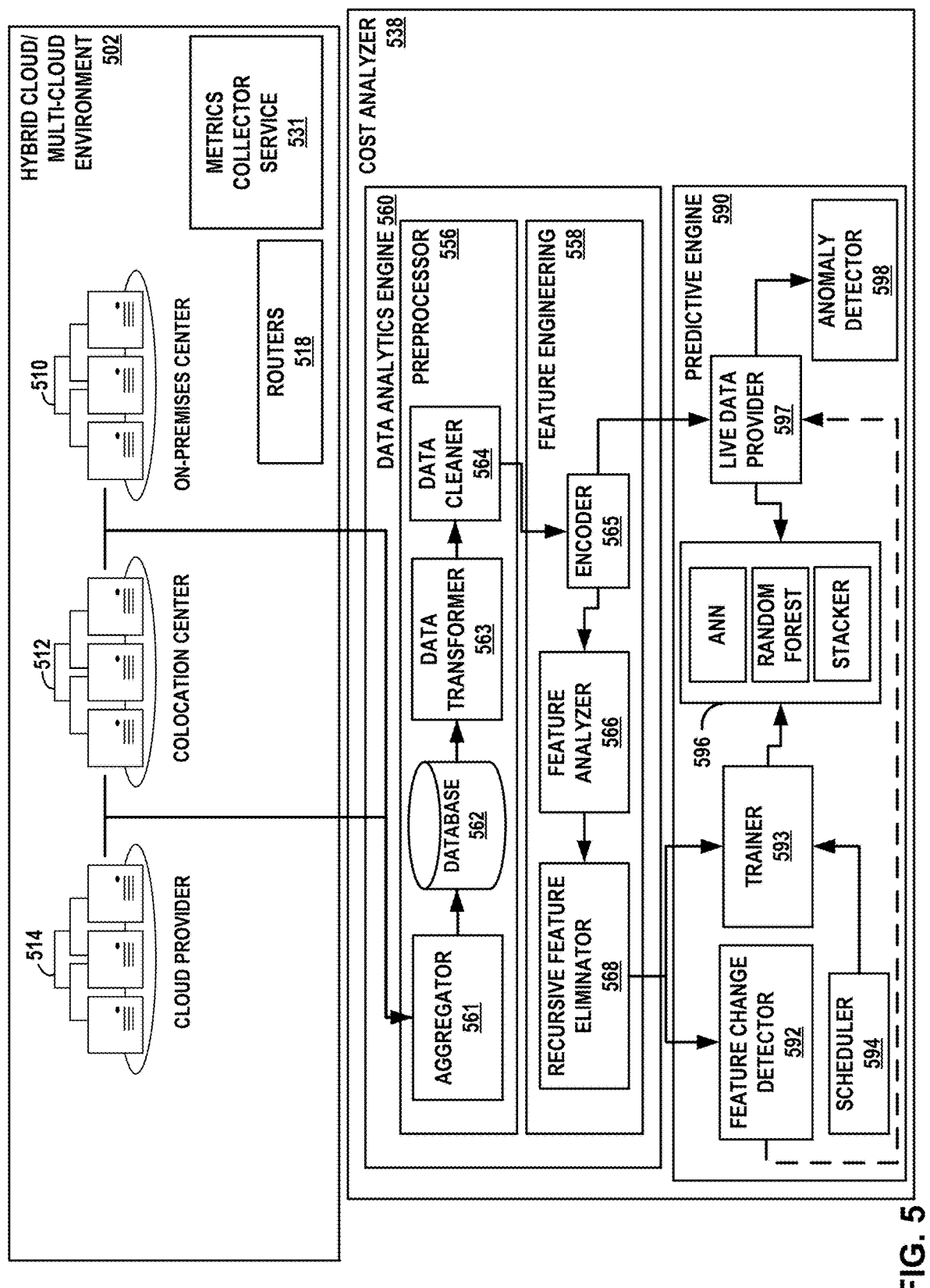
FIG. 5 is a conceptual diagram illustrating an example cost analyzer for application aware adaptive routing, according to one or more aspects of this disclosure.

FIG. 5 is a conceptual diagram illustrating example cost analyzer 538 for application aware adaptive routing, according to one or more aspects of this disclosure. Hybrid cloud/multi-cloud (HCMC) environment 502, cloud provider 514, colocation center 512, and on-premises center 510 of FIG. 5 may be example or alternative implementations of HCMC environment 302, cloud provider 314, colocation center 312, and on-premises center 310 of FIG. 3, respectively. Cost analyzer 538, data analytics engine 560, and predictive engine 590 of FIG. 5 may be example or alternative implementations of cost analyzer 238, data analytics engine 260, and predictive engine 290 of FIG. 2, respectively.

HCMC environment 502 may be configured for data collection and analysis while cost analyzer 538 may be configured for learning and predicting costs. Data centers 510, 512, 514 may send cost information (e.g., cost information stored as subscription information 239 of FIG. 2) associated with executing application instances and supporting operations of application services to cost analyzer 538. In some instances, metrics collector service 531 of HCMC environment 502 may include an agent or service for outputting SLE metrics. Metrics collector service 531 may collect, via routers 518 (e.g., session routers), various metrics from data centers 510, 512, 514, such as CPU utilization, memory usage, and disk I/O, to estimate the costs of running workloads on-premises. Cost analyzer 538 may analyze collected cost data to predict the costs of running workloads (e.g., applications) in HCMC environment 502, considering the costs of different cloud providers and data centers of HCMC 502. By considering both environments, cost analyzer 538 may provide more accurate and holistic cost predictions for HCMC environment 502.

Data analytics engine 560 of cost analyzer 538 may be configured to collect raw data from data centers 510, 512, 514. Data analytics engine 560 may pre-process the raw data for analysis and extract relevant features that can be used to train a cost prediction model. Preprocessor 556 of data analytics engine 560 may be configured to collect raw data from metrics collector service 531 for analysis. Preprocessor 556 may preprocess the raw data by executing tasks such as data cleaning, normalization, and transformation. Data cleaning involves identifying and correcting errors or inconsistencies in the raw data, such as missing values or duplicate entries. Normalization involves scaling the raw data to a common range to ensure that each feature is given equal weight in the analysis. Transformation involves collating past data (e.g., last 14 days) and tabulating the data for further processing. By performing these tasks, preprocessor 556 ensures that quality and reliability of the data used for analysis.

Aggregator 561 of preprocessor 556 may aggregate all types of data such as daily cost data and metric data from HCMC environment 502 and store it at database 562 in a systematic way. Data transformer 563 of preprocessor 556 may extract the data from database 562 and convert it to a data frame and add lag to the cost data. Data cleaner of preprocessor 556 may remove redundant data and nulls from the data frame.

Feature engineering 558 of data analytics engine 560 may be configured to transform relevant pre-processed data into a new set of features that can be used to train the cost prediction model. Feature engineering 558 includes identifying patterns in resource usage, pricing trends, and other factors that may impact the cost of running applications at HCMC environment 502. Feature engineering 558 may involve dimensionality reduction, encoding, and transformation. Dimensionality reduction involves reducing the number of features in the data to improve the efficiency and accuracy of the analysis. By extracting relevant features from the data, feature engineering 558 may enable the cost prediction model to predict future costs and identify opportunities for cost savings more accurately.

Encoder 565 of feature engineering 558 may be configured to apply one hot encoding to the categorical features. Feature analyzer 566 of feature engineering 558 may be configured to filter features by fining correlation of input features with target variables. Recursive feature eliminator 568 of feature engineering 558 may be a second stage of feature filtering in a recursive manager. Recursive feature eliminator 568 may recursively remove less important features such that predictive engine 590 is trained on at least the important features.

Predictive engine 590 of cost analyzer 538 may utilize machine learning algorithms and deep learning techniques to train a model for accurate cost prediction in HCMC environment 502. Predictive engine 590 leverages the extracted features and historical cost data from data analytics engine 560 to train the model, enabling the model to predict the future cost of running applications in HCMC environment 502. For example, trainer 593 of predictive engine 590 may retrieve all features and training examples from feature engineering 558 to train model set 596 to predict costs for new network configurations. In some instances, feature change detector 592 of predictive engine 590 may determine, based on whether features received from recursive feature eliminator 568 have change, whether to update models of model set 595 or generate predictions based on previous learning. Feature change detector 592 may send an indication to trainer 593 of any feature changes since the latest model update of model set 596. Trainer 593 may fine-tune model set 596 based on any updated features. Scheduler 594 may include computer readable instructions for scheduling instances trainer 593 trains, retrains, or fine-tunes model set 596.

Predictive engine 590 employs multiple machine-learning models of model set 595 including, artificial neural networks (ANN) and random forest regressor, to train different models using various types of feature-engineered data. Live data provider 597 of predictive engine 590 may convert raw data into a feature set consistent with training data for model set 596. Live data provider 597 feeds the processed data into model set 596 to generate and output a predicted cost associated with new network configurations. Live data provider 597 may additionally or alternatively provide the processed data to anomaly detector 598 to detect potential network anomalies associated with new network configurations. By utilizing different algorithms and feature engineering techniques, cost analyzer 538 may capture a wide range of patterns and relationships that influence the cost of running application in HCMC environment 502.

Predictive engine 590 continuously refines and updates the trained models of model set 596 based on new data, allowing cost analyzer 538 to improve the accuracy of its predictions over time. Predictive engine 590 ensures that machine learning models of model set 596 remain up-to-date and can adapt to changing cost patterns and trends associated with HCMC environment 502. To train the models of model set 596, predictive engine 590 utilizes various types of data such as historical component-wise cost data, which provides insights into the cost breakdown of different cloud resources. Additionally or alternatively, a current and previous month's bill associated with a subscription of data centers of HCMC environment 502 may be considered to capture the billing trends and may change over time. Predictive engine 590 may incorporate the bills and data usage within the last 14 days to provide information on resource utilization patterns to the trained models of model set 596. Predictive engine 590 may additionally or alternatively provide information associated with the average bits per second (bps) in the past 7 days to the trained models of model set 596 to understand network traffic patterns.

To improve the accuracy and robustness of costs predictions, predictive engine 590 may incorporate a stacker of model set 596, which combines and outputs multiple models to generate the final prediction. By predictive engine 590 implementing this ensemble approach with model set 596, predictive engine 590 may mitigate the limitations of individual models and provides a more reliable and accurate cost prediction. In general, predictive engine 590 utilizes machine learning algorithms, deep learning techniques, and various types of feature-engineered data to train machine learning models of model set 596 for cost prediction in HCMC environment 502. By continuously refining the models of model set 596 and incorporating diverse data sources, cost analyzer 538 aims to provide accurate and reliable predictions of monthly costs, enabling customers and organizations to improve cost allocation and make informed decisions regarding workload placement and resource allocation in HCMC environment 502.

Figure 6:
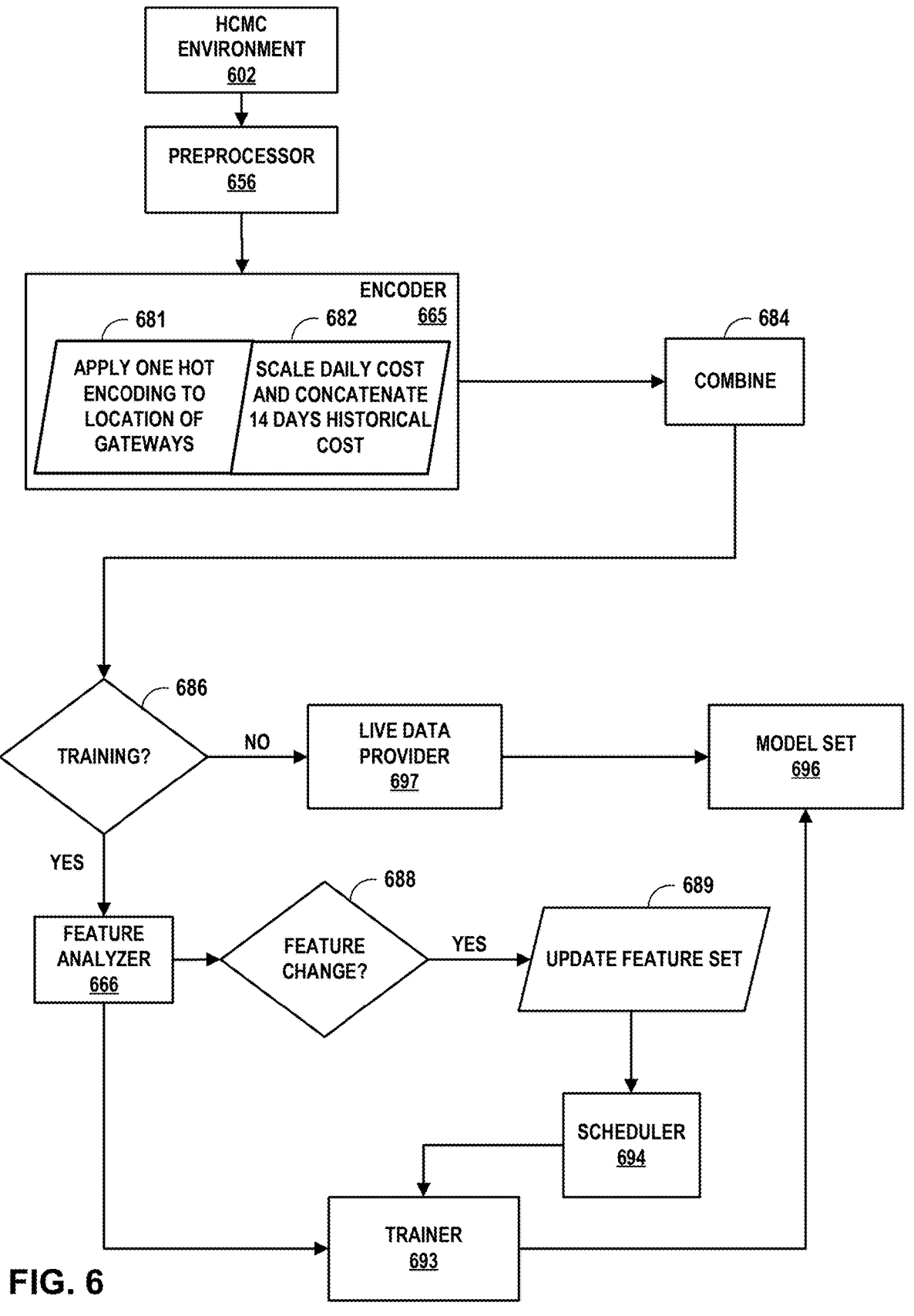
FIG. 6 is a conceptual diagram illustrating training of an example model set for application aware adaptive routing, according to one or more aspects of this disclosure.

FIG. 6 is a conceptual diagram illustrating training of example model set 696 for application aware adaptive routing, according to one or more aspects of this disclosure. HCMC environment 602, preprocessor 656, encoder 665, live data provider 697, model set 696, feature analyzer 666, trainer 693, and scheduler 694 of FIG. 6 may be example or alternative implementations of HCMC environment 502, preprocessor 556, encoder 565, live data provider 597, model set 596, feature analyzer 566, trainer 593, and scheduler 594 of FIG. 5, respectively.

Preprocessor 656 may obtain data from HCMC environment 602 including historical cost data, historical metrics (e.g., bits per second, data usage, etc.), and location of gateways. Preprocessor 656 may process the obtained data for training. Encoder 665 may encode all the data in terms of numbers as well as scale all the number to be between 0 and 1 (e.g., normalize the numbers). Encoder 665 may represent the gateway location information by using one hot encoding (681). Encoder 665 may encode the data in arrays of equal size to represent the possible number of gateways for a provider that is represented as 0 or 1 (682). Encoder 665 may encode each element at a given index that indicates the presence of a gateway at some location.

Encoder 665 may combine the data into features (e.g., tabular format where the last column represents a monthly bill) for machine learning algorithms (684). For example, encoder 665 may combine the data such that the first 14 columns may represent previous 14 days cost data, the next few columns represent the one hot encoded Boolean array representing gateway locations. The next columns may represent various metrics in the past 7 days across all gateways of providers of HCMC environment 602, and the last column may represent a current bill. Encoder 665 may divide the historical cost data by a remaining number of days as it is inversely proportional to the average cost to be predicted for the remaining days.

Training model set 696 may include a multi-step approach to analyze and process extracted features. For example, feature analyzer 666 may implement Principal Component Analysis (PCA) to identify the most informative features. Feature analyzer 666 may implement a recursive feature elimination process, which involves retraining the most relevant features that contribute significantly to prediction accuracy while discarding the remaining features.

During the training phase (YES branch 686), feature analyzer 666 may retrieve all features and training examples since the last model update. Feature analyzer 666 may check for any changes in the feature set and update it accordingly (688). In instances where there is a change in the feature set, trainer 693 may train machine learning models of model set 696 on all the data since inception and retrain the machine learning models of model set 696 with the updated feature set (YES branch 688) (689).

In the inference stage (NO branch 686), live data provider 697 may convert raw data into a feature set consistent with the training data for machine learning models of model set 696. This processed data is then fed into model set 696 to generate a predicted monthly bill. Model set 696 may include diverse models such as Random Forests, Artificial Neural Networks, and a stacker model that aggregates predictions from other models to produce the final predicted bill. Trainer 693 may implement ensemble learning when training model set 696 to mitigate bias and variance, thereby reducing underfitting and overfitting. The ensemble models of model set 696 may be trained on various types of data, such as historical costs and historical metrics, to ensure robustness and generalizability.

FIG. 7 is a table illustrating an example evaluation of features not implementing the techniques described herein and features implementing the techniques described herein. As can be seen in FIG. 7, in instances where an AAAR engine, as described herein, is enabled, the observed features (e.g., observed SLE and cost of infrastructure/day) are improved compared to manually provisioning network links or underutilized provisioning.

FIG. 8 is a flow diagram illustrating an example operation of application aware adaptive routing, according to one or more aspects of this disclosure. FIG. 8 may be discussed with respect to FIG. 1B for example purposes only.

Cloud manager system 130 may obtain a plurality of records indicating historical traffic flows for an application having application instances executing at each of a plurality of data centers (802). For example, metrics collector 132 may obtain session records for application instances 181A-181E executing at data centers 110, 112, 114A, 114B via respective routers 118. Cloud manager system 130 may determine, based on the plurality of records, whether a current network configuration for connections among the plurality of data centers will satisfy one or more service level expectations (SLEs) for the application, the current network configuration including first configuration information for a first set of links that facilitate traffic flows among the application instances located in different data centers of the plurality of data centers (804). For example, AAAR engine 140 may determine, based on session records collected by metrics collector 132, whether a current network configuration for connections among data centers 110, 112, 114A, 114B will satisfy one or more SLEs, such latency thresholds, user experience criteria, or other performance indicators. The current network configuration may include configuration information (e.g., scheduling policies) for a first set of links of links 144 that facilitate traffic flows among application instances 181A-181E located in different data centers of data centers 110, 112, 114A, 114B.

Based on cloud manager system 130 determining the current network configuration will not satisfy the one or more SLEs for the application, cloud manager system 130 may generate, based on the plurality of records and the one or more SLEs, a new network configuration including second configuration information for a second set of links (806). For example, AAAR engine 140 may generate, based on the session records and the SLEs, a new network configuration including configuration information for a policy indicating a schedule to create, modify, and/or decommission a second set of links of links 144 to facilitate network traffic for application instances 181A-181E. Cloud manager system 130 may provision, based on the new network configuration, the second set of links at the plurality of data centers to facilitate the traffic flows among the application instances located in different data centers of the plurality of data centers (808). For example, provisioning module 142 may provision, based on new network configurations (e.g., updated or approved new, improved network configurations), the second set of links of links 144 by sending the second configuration information (e.g., a policy for provisioning, using, and decommissioning links) to routers 118.

The techniques described herein may be implemented in hardware, software, firmware, or any combination thereof. Various components, functional units, and/or modules illustrated in the figures and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise one or more computer data storage mediums, such as random access memory (RAM), read-only memory (ROM), nonvolatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system comprising processing circuitry having access to a memory, the processing circuitry configured to:

obtain a plurality of records indicating historical traffic flows for an application having application instances executing at each of a plurality of data centers;

determine, based on the plurality of records, whether a current network configuration for connections among the plurality of data centers will satisfy one or more service level expectations (SLEs) for the application, the current network configuration including first configuration information for a first set of links that facilitate traffic flows among the application instances located in different data centers of the plurality of data centers; and based on determining the current network configuration will not satisfy the one or more SLEs for the application: generate, based on the plurality of records and the one or more SLEs, a new network configuration including second configuration information for a second set of links, and provision, based on the new network configuration, the second set of links at the plurality of data centers to facilitate the traffic flows among the application instances located in different data centers of the plurality of data centers.

2. The computing system of claim 1, wherein the plurality of data centers includes at least two of: an on-premises data center, a colocation data center, and a cloud service provider.

3. The computing system of claim 1, wherein the new network configuration includes second configuration information indicating a policy defining respective time windows for creating, using, and decommissioning the second set of links, and wherein to provision the second set of links, the processing circuitry is configured to send the policy to routers interconnecting the plurality of data centers.

4. The computing system of claim 1, wherein the new network configuration includes second configuration information indicating respective link types for the second set of links.

5. The computing system of claim 1, wherein to generate the new network configuration, the processing circuitry is configured to:

determine, based on the plurality of records and for each link of the first set of links, a baseline bandwidth to facilitate the traffic flows of the application instances executing at the plurality of data centers; and generate, using a machine learning model, the new network configuration based on the baseline bandwidth and the one or more SLEs for the application.

6. The computing system of claim 1, wherein to generate the new network configuration, the processing circuitry is further configured to: update the new network configuration based on cost information associated with executing the application instances at the plurality of data centers.

7. The computing system of claim 1, wherein to determine whether the current network configuration will satisfy the one or more SLEs for the application, the processing circuitry is configured to determine whether the current network configuration will satisfy the one or more SLEs during a time window associated with high network traffic associated with the application.

8. The computing system of claim 1, wherein to determine the current network configuration will satisfy the one or more SLEs for the application, the processing circuitry is configured to determine whether the current network configuration will satisfy the one or more SLEs during a time window associated with synchronizing data for the application at the plurality of data centers.

9. The computing system of claim 1, wherein to determine whether the current network configuration will satisfy the one or more SLEs for the application, the processing circuitry is configured to:

determine, based on the plurality of records, traffic metrics associated with the application; and determine, based on the traffic metrics, whether the current network configuration will satisfy the one or more SLEs for the application.

10. The computing system of claim 9, wherein:

the traffic metrics include one or more of: bandwidth, jitter, latency, packet loss, and throughput associated with the traffic flows among the application instances; and the one or more SLEs for the application includes one or more of: a service availability threshold, performance indicator conditions, user experience criteria, a number of allowable packet drops, bandwidth thresholds, and latency thresholds.

11. A method comprising:

obtaining, by a cloud management system, a plurality of records indicating historical traffic flows for an application having application instances executing at each of a plurality of data centers;

determining, by the cloud management system and based on the plurality of records, whether a current network configuration for connections among the plurality of data centers will satisfy one or more service level expectations (SLEs) for the application, the current network configuration including first configuration information for a first set of links that facilitate traffic flows among the application instances located in different data centers of the plurality of data centers; and based on determining the current network configuration will not satisfy the one or more SLEs for the application: generating, by the cloud management system and based on the plurality of records and the one or more SLEs, a new network configuration including second configuration information for a second set of links, and provisioning, by the cloud management system and based on the new network configuration, the second set of links at the plurality of data centers to facilitate the traffic flows among the application instances located in different data centers of the plurality of data centers.

12. The method of claim 11, wherein the plurality of data centers includes at least two of: an on-premises data center, a colocation data center, and a cloud service provider.

13. The method of claim 11, wherein the new network configuration includes second configuration information indicating a policy defining respective time windows for creating, using, and decommissioning the second set of links, and wherein provisioning the second set of links comprises sending the policy to routers interconnecting the plurality of data centers.

14. The method of claim 11, wherein generating the new network configuration comprises:

determining, based on the plurality of records and for each link of the first set of links, a baseline bandwidth to facilitate the traffic flows of the application instances executing at the plurality of data centers; and generating, using a machine learning model, the new network configuration based on the baseline bandwidth and the one or more SLEs for the application.

15. The method of claim 11, wherein generating the new network configuration further comprises: updating the new network configuration based on cost information associated with executing the application instances at the plurality of data centers.

16. The method of claim 11, wherein determining whether the current network configuration will satisfy the one or more SLEs for the application comprises: determining whether the current network configuration will satisfy the one or more SLEs during a time window associated with high network traffic associated with the application.

17. The method of claim 11, wherein determining whether the current network configuration will satisfy the one or more SLEs for the application comprises: determining whether the current network configuration will satisfy the one or more SLEs during a time window associated with synchronizing data for the application at the plurality of data centers.

18. Non-transitory computer-readable storage media, storing instructions, that when executed by processing circuitry, cause the processing circuitry to:

obtain a plurality of records indicating historical traffic flows for an application having application instances executing at each of a plurality of data centers;

determine, based on the plurality of records, whether a current network configuration for connections among the plurality of data centers will satisfy one or more service level expectations (SLEs) for the application, the current network configuration including first configuration information for a first set of links that facilitate traffic flows among the application instances located in different data centers of the plurality of data centers; and based on determining the current network configuration will not satisfy the one or more SLEs for the application: generate, based on the plurality of records and the one or more SLEs, a new network configuration including second configuration information for a second set of links, and provision, based on the new network configuration, the second set of links at the plurality of data centers to facilitate the traffic flows among the application instances located in different data centers of the plurality of data centers.

19. The non-transitory computer-readable storage media of claim 18, wherein the plurality of data centers includes at least two of: an on-premises data center, a colocation data center, and a cloud service provider.

20. The non-transitory computer-readable storage media of claim 18, wherein the new network configuration includes second configuration information indicating a policy defining respective time windows for creating, using, and decommissioning the second set of links, and wherein to provision the second set of links, the processing circuitry is configured to send the policy to routers interconnecting the plurality of data centers.

* * * * *